(12) United States Patent
Kurata et al.

(10) Patent No.: US 9,570,759 B2
(45) Date of Patent: Feb. 14, 2017

(54) MANUFACTURING METHOD OF ELECTRODE CATALYST LAYER, MEMBRANE ELECTRODE ASSEMBLY USING THE SAME, FUEL CELL USING THE SAME AND COMPLEX PARTICLES

(75) Inventors: Haruna Kurata, Tokyo (JP); Hiroyuki Morioka, Tokyo (JP); Saori Okada, Tokyo (JP); Kenichiro Oota, Kanagawa (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 13/433,045

(22) Filed: Mar. 28, 2012

(65) Prior Publication Data

US 2012/0189941 A1    Jul. 26, 2012

Related U.S. Application Data

(63) Continuation of application No. PCT/JP2010/054376, filed on Mar. 16, 2010.

(30) Foreign Application Priority Data

Sep. 29, 2009 (JP) ................................. 2009-223894
Sep. 29, 2009 (JP) ................................. 2009-223923

(51) Int. Cl.
*H01M 8/10* (2016.01)
*H01M 4/96* (2006.01)
(Continued)

(52) U.S. Cl.
CPC ........ *H01M 4/8828* (2013.01); *H01M 4/8652* (2013.01); *H01M 4/881* (2013.01);
(Continued)

(58) Field of Classification Search
USPC ....... 427/115; 429/42–44, 483–485; 502/101
See application file for complete search history.

(56) References Cited

U.S. PATENT DOCUMENTS 5,723,173 A * 3/1998 Fukuoka et al. .............. 427/115
5,728,485 A * 3/1998 Watanabe ........... H01M 4/8605
                                                               204/282
(Continued)

FOREIGN PATENT DOCUMENTS

JP      02-082456       3/1990
JP      02-048632       10/1990
(Continued)

OTHER PUBLICATIONS

Ishihara et al., "Partially Oxidized Tantalum Carbonitrides as a New Nonplatinum Cathode for PEFC", J. Electrochem. Soc. 2008, vol. 155, Issue 4, pp. B400-B406, (Feb. 20, 2008).*
(Continued)

*Primary Examiner* — Ula C Ruddock
*Assistant Examiner* — Osei Amponsah
(74) *Attorney, Agent, or Firm* — Squire Patton Boggs (US) LLP (57) ABSTRACT

The present invention provides a manufacturing method of an electrode catalyst layer which contains a catalyst, carbon particles and a polymer electrolyte, wherein an oxide type of non-platinum catalyst is used as the catalyst and a fuel cell employing the electrode catalyst layer achieves a high level of power generation performance. The manufacturing method of the electrode catalyst layer of the present invention includes at least: preparing a first catalyst ink, in which a catalyst, first carbon particles and a first polymer electrolyte are dispersed in a first solvent, drying the first catalyst ink to form complex particles, preparing a second catalyst ink, in which the complex particles, second carbon particles and a second polymer electrolyte are dispersed in a second solvent, and coating the second catalyst ink on a substrate to form the electrode catalyst layer.

9 Claims, 2 Drawing Sheets

(51) Int. Cl.
  *H01M 4/88*    (2006.01)
  *B05D 5/12*    (2006.01)
  *H01M 4/86*    (2006.01)
  *H01M 4/90*    (2006.01)

(52) U.S. Cl.
  CPC ....... *H01M 4/8807* (2013.01); *H01M 4/9016* (2013.01); *H01M 2008/1095* (2013.01); *Y02E 60/50* (2013.01)

(56) References Cited

U.S. PATENT DOCUMENTS

| | | | |
|---|---|---|---|
| 5,869,132 A * | 2/1999 | Watanabe et al. | 427/215 |
| 6,156,449 A * | 12/2000 | Zuber | H01M 4/8807 |
| | | | 106/31.64 |
| 2006/0057454 A1* | 3/2006 | Nagasawa et al. | 429/44 |

FOREIGN PATENT DOCUMENTS

| | | | | |
|---|---|---|---|---|
| JP | 05-036418 | | 2/1993 | |
| JP | 10-241703 | | 9/1998 | |
| JP | 11-126615 | | 5/1999 | |
| JP | 2004-139899 | * | 5/2004 | ............. H01M 4/96 |
| JP | 2005-044659 | | 2/2005 | |
| JP | 2005-063677 | | 3/2005 | |
| JP | 2008-270176 | | 11/2008 | |
| JP | 2009-187848 | | 8/2009 | |

OTHER PUBLICATIONS

A. Ishihara et al., Partially Oxidized Tantalum Carbonitrides as a New Nonplatinum Cathode for PEFC-1-, J. of the Electrochem. Soc., 155 (4), pp. B400-B406 (2008).

* cited by examiner

MANUFACTURING METHOD OF ELECTRODE CATALYST LAYER, MEMBRANE ELECTRODE ASSEMBLY USING THE SAME, FUEL CELL USING THE SAME AND COMPLEX PARTICLES

This application is a continuation of International Application No. PCT/JP2010/054376, filed Mar. 16, 2010, which is incorporated herein by reference in its entirety. International Application No. PCT/JP2010/054376 claims priority to Japanese Patent Applications Nos. 2009-223923 and 2009-223894, both of which were filed on 29 Sep. 2009.

BACKGROUND OF THE INVENTION

Field of the Invention

The present invention relates to a manufacturing method of an electrode catalyst layer, the electrode catalyst layer, a membrane electrode assembly (MEA) and a fuel cell which include the electrode catalyst layer, and complex particles. More specifically, the present invention relates to a manufacturing method of an electrode catalyst layer which has high power generation performance using a non-platinum catalyst, the electrode catalyst layer, an MEA and a fuel cell which include the electrode catalyst layer, and complex particles.

Description of the Related Art

A fuel cell is a power generation system which produces electric power along with heat. A fuel gas including hydrogen and an oxidant gas including oxygen react together at electrodes containing a catalyst in a fuel cell so that a reverse reaction of water electrolysis takes place. A fuel cell is attracting attention as a clean energy source of the future because of advantages such as high efficiency, a small impact on the environment and a low level of noise relative to conventional power generation systems. A fuel cell is classified into several types according to an ion conductor employed therein. A fuel cell which uses a proton-conductive polymer membrane is called a proton exchange membrane fuel cell (PEMFC) or a polymer electrolyte fuel cell (PEFC).

Among various fuel cells, a PEMFC (or PEFC), which can be used at around room temperature, is considered as a promising fuel cell for use in vehicles and household stationary power supply etc. and is being developed widely in recent years. In the PEMFC (or PEFC), a joint unit which has a pair of electrode catalyst layers on both sides of a polymer electrolyte membrane and is called a membrane electrode assembly (MEA) is arranged between a pair of separators, on each of which either a gas flow path for supplying a fuel gas including hydrogen to one of the electrodes or a gas flow path for supplying an oxidant gas including oxygen to the other electrode is formed. The electrode for supplying a fuel gas is called a fuel electrode or anode electrode whereas the electrode for supplying an oxidant gas is called an air electrode or cathode electrode. In general, each of these electrodes includes an electrode catalyst layer, in which a polymer electrolyte(s) and catalyst loaded carbon particles are stacked, and a gas diffusion layer which has gas permeability and electron conductivity. A noble metal etc. such as platinum is used as the catalyst.

Apart from other problems such as improving durability and output density etc., cost reduction is the most major problem for putting the PEMFC (or PEFC) into practical use.

Since the PEMFC (or PEFC) at present employs expensive platinum as the electrode catalyst, an alternate catalyst material is strongly desired to fully promote the PEMFC (or PEFC). As more platinum is used in the air electrode than in the fuel electrode, an alternative to platinum (namely, a non-platinum catalyst) with a high level of catalytic performance for oxygen-reduction on the air electrode is particularly well under development.

A mixture of a noble metal and nitride of iron (a transition metal) described in Patent document 1 is an example of a non-platinum catalyst for the air electrode. In addition, a nitride of molybdenum (a transition metal) described in Patent document 2 is another example. These catalyst materials, however, have an insufficient catalytic performance for oxygen-reduction in an acidic electrolyte and are dissolved in some cases.

On the other hand, Non-patent document 1 reports that a partially-oxidized tantalum carbonitride has both excellent stability and catalytic performance. It is true that this oxide type non-platinum catalyst has a high level of catalytic performance for oxygen-reduction in itself but it remains necessary to develop an appropriate method to make it into the electrode catalyst layer in order to obtain an MEA with a high level of output performance.

Moreover, Patent document 3 describes an MEA employing a non-platinum catalyst. In Patent document 3, however, there is such a problem that a method to make the non-platinum catalyst into an electrode catalyst layer is not suitable for a non-platinum catalyst since it is a method which is described, for example, in Patent document 4 and Patent document 5 etc. and is conventionally used for platinum catalyst.

<Patent document 1>: JP-A-2005-44659.
<Patent document 2>: JP-A-2005-63677.
<Patent document 3>: JP-A-2008-270176.
<Patent document 4>: JP-B-H02-48632 (JP-A-H01-62489).
<Patent document 5>: JP-A-H05-36418.
<Non-patent document 1>: "Journal of The Electrochemical Society", Vol. 155, No. 4, pp. B400-B406 (2008).

SUMMARY OF THE INVENTION

The present invention aims to solve the problems of conventional techniques. The present invention provides an electrode catalyst layer which has a high level of power generation performance using an oxide type of non-platinum catalyst as a catalyst material as well as a manufacturing method thereof. In addition, the present invention provides an MEA and a fuel cell which include the electrode catalyst layer and also provides complex particles.

After eager research to solve various problems, the inventors completed the present invention.

A first aspect of the present invention is a manufacturing method of an electrode catalyst layer for a fuel cell including: preparing a first catalyst ink in which at least a catalyst, first carbon particles and a first polymer electrolyte are dispersed in a first solvent, drying the first catalyst ink to form complex particles in which the catalyst and the first carbon particles are embedded in the first polymer electrolyte, preparing a second catalyst ink in which the complex particles, second carbon particles and a second polymer electrolyte are dispersed in a second solvent, and coating the second catalyst ink on a substrate to form an electrode catalyst layer.

A second aspect of the present invention is the manufacturing method according to the first aspect of the present invention, wherein the first catalyst ink is dried at a temperature in the range of 30-140° C.

A third aspect of the present invention is the manufacturing method according to the second aspect of the present invention, wherein a pretreatment in which the complex particles and the second carbon particles are mixed together without any solvent is performed before preparing the second catalyst ink.

A fourth aspect of the present invention is the manufacturing method according to the third aspect of the present invention, wherein the complex particles and the second carbon particles receive a heat treatment after performing the pretreatment.

A fifth aspect of the present invention is the manufacturing method according to the fourth aspect of the present invention, wherein the heat treatment is performed at a temperature in the range of 50-180° C.

A sixth aspect of the present invention is the manufacturing method according to the fifth aspect of the present invention, wherein the catalyst is an electrode active material for an oxygen reduction electrode, which is used as a positive electrode of a fuel cell, and wherein the catalyst contains at least one transition metal of the group of Ta, Nb, Ti and Zr.

A seventh aspect of the present invention is the manufacturing method according to the sixth aspect of the present invention, wherein the catalyst is a product made by partially-oxidizing a carbonitride of one transition metal of the group of Ta, Nb, Ti and Zr.

An eighth aspect of the present invention is the manufacturing method according to the seventh aspect of the present invention, wherein the one transition metal is Ta.

A ninth aspect of the present invention is the manufacturing method according to the eighth aspect of the present invention, wherein the catalyst and the first carbon particles form "catalyst loaded carbon particles", and wherein the second carbon particles have a larger specific surface area than the "catalyst loaded carbon particles".

A tenth aspect of the present invention is the manufacturing method according to the ninth aspect of the present invention, wherein a weight ratio between the first carbon particles and the first polymer electrolyte is in the range of 1:0.05 to 1:10.

An eleventh aspect of the present invention is a membrane electrode assembly including: a polymer electrolyte membrane, a pair of electrode catalyst layers manufactured by the manufacturing method according to the tenth aspect of the present invention, and a pair of gas diffusion layers, wherein the polymer electrolyte membrane is interposed between the pair of electrode catalyst layers and the pair of electrode catalyst layers are interposed between the pair of gas diffusion layers.

A twelfth aspect of the present invention is a fuel cell including: the membrane electrode assembly according to the eleventh aspect of the present invention, and a pair of separators, wherein the membrane electrode assembly is interposed between the pair of separators.

A thirteenth aspect of the present invention is the manufacturing method according to the eighth aspect of the present invention, wherein the first carbon particles have a larger specific surface area than the catalyst.

A fourteenth aspect of the present invention is the manufacturing method according to the thirteenth aspect of the present invention, wherein a weight ratio between the catalyst and the first carbon particles is in the range of 1:0.01 to 1:0.5.

A fifteenth aspect of the present invention is the manufacturing method according to the fourteenth aspect of the present invention, wherein a weight ratio between the first carbon particles and the first polymer electrolyte is in the range of 1:0.5 to 1:50.

A sixteenth aspect of the present invention is a membrane electrode assembly including: a polymer electrolyte membrane, a pair of electrode catalyst layers manufactured by the manufacturing method according to the fifteenth aspect of the present invention, and a pair of gas diffusion layers, wherein the polymer electrolyte membrane is interposed between the pair of electrode catalyst layers and the pair of electrode catalyst layers are interposed between the pair of gas diffusion layers.

A seventeenth aspect of the present invention is a fuel cell including: the membrane electrode assembly according to the sixteenth aspect of the present invention, and a pair of separators, wherein the membrane electrode assembly is interposed between the pair of separators.

An eighteenth aspect of the present invention is complex particles at least including: a catalyst, carbon particles, and a polymer electrolyte, wherein the catalyst is loaded on the carbon particles to form "catalyst loaded carbon particles", and wherein the "catalyst loaded carbon particles" are embedded in the polymer electrolyte.

A nineteenth aspect of the present invention is complex particles at least including: a catalyst, carbon particles, and a polymer electrolyte, wherein the carbon particles have a larger specific surface area than the catalyst, and wherein the catalyst and the carbon particles are embedded in the polymer electrolyte.

The present invention provides a manufacturing method of an electrode catalyst layer which has a higher level of output performance by improving a contact between a catalyst and carbon particles to increase active reaction sites, as well as an MEA and a fuel cell which employ the electrode catalyst layer. The present invention also provides complex particles which are used therein.

DESCRIPTION OF NUMERALS

1: Polymer electrolyte membrane
2: Electrode catalyst layer
3: Electrode catalyst layer
12: Membrane electrode assembly (MEA)
4: Gas diffusion layer
5: Gas diffusion layer
6: Air electrode (Cathode electrode)
7: Fuel electrode (Anode electrode)
8: Gas flow path
9: Cooling water flow path
10: Separator

EMBODIMENT OF THE INVENTION

An MEA of an embodiment of the present invention is described below. Embodiments of the present invention are not fully limited to the embodiment of the present invention described below since the embodiment can be modified, redesigned, changed, and/or added with details etc. according to any knowledge of a person in the art so that the scope of the embodiment of the present invention is expanded.

Figure 1:
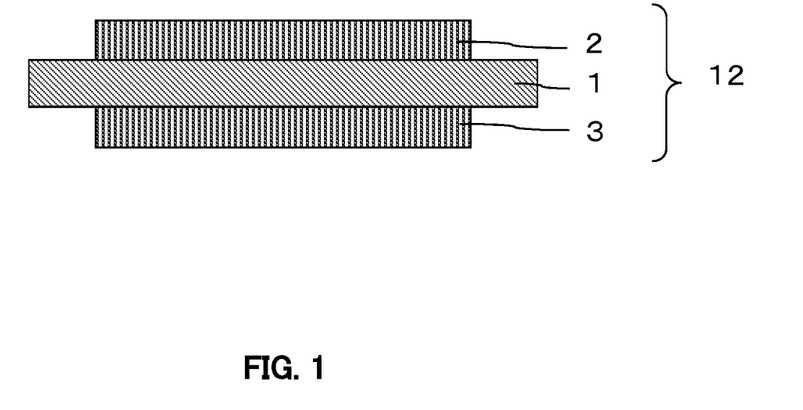
FIG. 1 is a cross sectional exemplary diagram of an MEA of an embodiment of the present invention.

FIG. 1 illustrates a concise cross section diagram of an MEA 12 of an embodiment of the present invention. The MEA 12 related to the embodiment of the present invention has a polymer electrolyte membrane 1, an electrode catalyst layer (of an air electrode) 2 on a surface of the polymer electrolyte membrane 1, and an electrode catalyst layer (of a fuel electrode) 3 on the other surface of the polymer electrolyte membrane 1, as is shown in FIG. 1.

Figure 2:
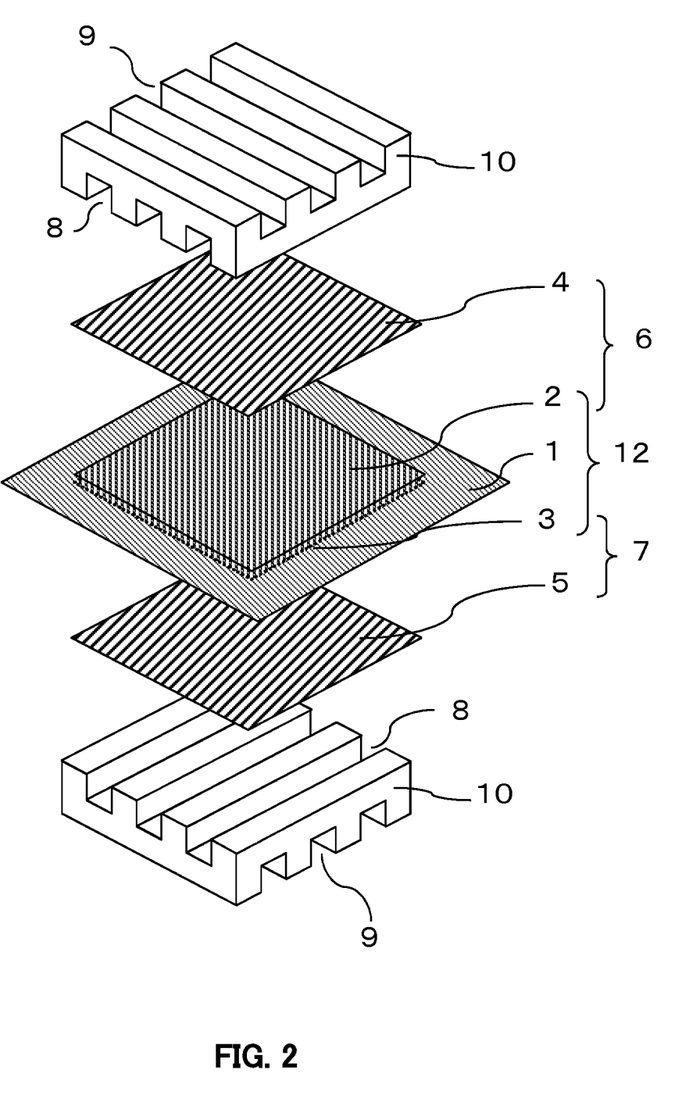
FIG. 2 is an exploded exemplary diagram of a fuel cell of an embodiment of the present invention.

FIG. 2 illustrates an exploded exemplary diagram of a fuel cell of an embodiment of the present invention. In the fuel cell, a gas diffusion layer (of the air electrode) 4 and a gas diffusion layer (of the fuel electrode) 5 are arranged facing the electrode catalyst layer 2 and electrode catalyst layer 3, respectively. These are structures of the air electrode (cathode electrode) 6 and the fuel electrode (anode electrode) 7. Moreover, a pair of separators 10 is arranged in the fuel cell, wherein each separator 10 is made of a conductive and impermeable material and has a gas flow path 8 for transporting a gas on one surface and a cooling water path 9 for transporting cooling water on the opposite surface. A fuel gas such as hydrogen gas for example, is supplied through the gas flow path 8 on the separator 10 of the fuel electrode 7 whereas an oxidant gas such as a gas containing oxygen for example, is supplied through the gas flow path 8 on the separator 10 of the air electrode 6. Then, an electromotive force is generated between the fuel electrode 7 and the air electrode 6 by an electrode reaction between hydrogen as the fuel gas and the oxygen gas under the presence of the catalyst.

The fuel cell illustrated in FIG. 2 is one of a so-called "unit cell" structured fuel cell, in which the polymer electrolyte membrane 1, the electrode catalyst layers 2 and 3, and the gas diffusion layers 4 and 5 are interposed between the pair of separators 10, while the present invention also includes a fuel cell in which a plurality of unit cells are stacked via the separator 10.

In a manufacturing method of an electrode catalyst layer of the present invention, complex particles, in which both a catalyst and some carbon particles (hereinafter called "first carbon particles") are embedded in a polymer electrolyte (hereinafter called "first polymer electrolyte"), are prepared to improve proton conductivity of a surface of the catalyst so that a higher level of contact between the catalyst and the carbon particles is provided to increase active reaction sites and improve output performance. In a conventional method, in which any of the catalyst and the first carbon particles are not embedded in a polymer electrolyte, proton conductivity on a surface of the catalyst is so low that it is impossible to increase active reaction sites because the first carbon particles, which have larger specific surface area than the catalyst, are dominantly embedded in the polymer electrolyte when forming the electrode catalyst layer. In addition, in a method in which only the catalyst is embedded in the polymer electrolyte, it is difficult to sufficiently increase active reaction sites because a degree of contact between the catalyst and the first carbon particles decreases. Moreover, although it is yet possible in the conventional method to increase proton conductivity on a surface of the catalyst by using a highly concentrated polymer electrolyte as the first polymer electrolyte, it becomes difficult then to improve output performance because an amount of the first polymer electrolyte is excessive with respect to the carbon particles.

It is preferable in the complex particles in the present invention that "catalyst loaded carbon particles" in which the catalyst is loaded on the first carbon particles are formed and have a specific surface area smaller than that of second carbon particles, which are later to be blended together with the complex particles. It is preferable that such "catalyst loaded carbon particles" are embedded in the first polymer electrolyte to form the complex particles. In such a case, it is possible to obtain such high proton conductivity on a surface of the catalyst that active reaction sites are increased.

In the case where this type of complex particles are used, a first catalyst ink in which the "catalyst loaded carbon particles" and the first polymer electrolyte are dispersed in a solvent is prepared. Then, it becomes possible to control a weight ratio between "carrier carbon particles" (namely, the first carbon particles, here) and the first polymer electrolyte in the "catalyst loaded carbon particles" which is formed by drying the first catalyst ink by a composition of the first catalyst ink. It is preferable that the weight ratio between the "carrier carbon particles" and the first polymer electrolyte is in the range of 1:0.05 to 1:10. In the case where the weight ratio of the first polymer electrolyte with respect to the "carrier carbon particles" is less than 0.05, the output performance may not be improved because proton conductivity on a surface of the catalyst is hardly improved and active reaction sites are hardly increased. On the other hand, in the case where the weight ratio of the first polymer electrolyte to the "carrier carbon particles" is more than 10, the output performance may not be improved because gas diffusion to the active reaction sites is inhibited.

In another case, it is also preferable that the complex particles of the present invention are complex particles in which both the first carbon particles and the catalyst which has a smaller specific surface area than the first carbon particles are independently embedded in the first polymer electrolyte. In such a case, it is possible to improve not only proton conductivity on the surface of the catalyst but also contact between the catalyst and the first carbon particles so that active reaction sites are increased and the output performance is improved.

In the case where this type of complex particles are used, a first catalyst ink in which the catalyst, the first carbon particles and the first polymer electrolyte are dispersed in a solvent is prepared. Then, it becomes possible to control a weight ratio among the first polymer electrolyte, the first carbon particles and the catalyst, which are embedded in the first polymer electrolyte, in the complex particles, which are obtained by drying the first catalyst ink, can be controlled by adjusting the composition of the first catalyst ink. It is preferable that the weight ratio between the catalyst and the first carbon particles, which are embedded in the first polymer electrolyte, is in the range of 1:0.01 to 1:0.5 in the complex particles. In the case where the ratio of the first carbon particles with respect to the catalyst is less than 0.01, the output performance may not be improved due to a low level of contact between the catalyst and the carbon particles and difficulty in increasing active reaction sites. On the other hand, in the case where the ratio of the first carbon particles to the catalyst is higher than 0.5, the output performance may not be improved because proton conductivity on a surface of the catalyst is not improved and active reaction sites are hardly increased.

In addition, it is preferable that the weight ratio between the first carbon particles and the first polymer electrolyte is in the range of 1:0.5 to 1:50 in the complex particles. In the case where the weight ratio of the first polymer electrolyte is lower than 0.5 with respect to the first carbon particles, it is difficult to embed the first carbon particles in the first polymer electrolyte and improve proton conductivity on a surface of the catalyst and therefore active reaction sites are hardly increased and the output performance may not be improved. On the other hand, in the case where the weight ratio of the first polymer electrolyte to the first carbon particles is higher than 50 with respect to the first carbon particles, gas diffusion to active reaction sites may be inhibited so that the output performance is not improved.

In the manufacturing method of the electrode catalyst layer of the present invention, it is preferable that the first catalyst ink, in which the catalyst, the first carbon particles and the first polymer electrolyte are dispersed in a solvent, is dried at a temperature in the range of 30-140° C. In the case where the temperature for drying is lower than 30° C., the first polymer electrolyte in the complex particles dissolves with the solvent in preparing a second catalyst ink and therefore the output performance may not be improved. On the other hand, in the case where the temperature for drying is higher than 140° C., proton conductivity of the first polymer electrolyte in the complex particles may be harmed so that the output performance is not improved.

In the manufacturing method of the electrode catalyst layer of the present invention, it is preferable that the complex particles and the second carbon particles are preliminarily mixed together without any solvent before the second catalyst ink is prepared by dispersing the complex particles, the second carbon particles and a second polymer electrolyte in a solvent. In the case where this preliminarily mixing treatment is not performed, contacts between the complex particles and the second carbon particles become insufficient so that active reaction sites are hardly increased and the output performance may not be improved.

In addition, it is preferable that a heat treatment is performed after this preliminarily mixing without a solvent. In the case where this heat treatment is not performed, active reaction sites may be decreased in preparing the second catalyst ink. It is preferable that this heat treatment is performed at a temperature in the range of 50-180° C. In the case where the drying is performed at a temperature under 50° C., much of the first polymer electrolyte in the complex particles dissolves into the solvent when preparing the second catalyst ink, and the output performance may not be improved due to a decrease of active reaction sites. On the other hand, in the case where the drying is performed at a temperature higher than 180° C., proton conductivity of the first polymer electrolyte in the complex particles is inhibited to a low level so that the output performance may not be improved.

In preparing the second catalyst ink, in which the complex particles, the second particles and the second polymer electrolyte are dispersed in a solvent, instead of using a new polymer electrolyte as the second polymer electrolyte, it is alternatively possible to add a solvent to the complex particles so that a part of the first polymer electrolyte is dissolved and serves as the second polymer electrolyte.

It is possible to use a generally-used catalyst material as the catalyst related to an embodiment of the present invention. It is also possible in the present invention to use positive electrode active materials of PEMFC which contain at least one transition metal selected from the group of Ta, Nb, Tl and Zr, as alternatives to platinum in the air electrode.

In addition, it is also possible to use carbonitrides of these transition metals which are partially oxidized in an atmosphere including oxygen as the catalyst.

Specifically, a material obtained by partial oxidation of tantalum carbonitride (TaCN), that is TaCNO, which has a specific surface area in the range about 1-20 $m^2/g$ is included in such carbonitrides.

Any carbons which are in the shape of particles, electrically conductive and unreactive with the catalyst can be used as the carbon particles related to the embodiment of the present invention. For example, carbon blacks, graphites, black leads, active carbons, carbon fibers, carbon nano-tubes and fullerenes can be used. It is preferable that the carbon particles have a particle diameter in the range of 10-1000 nm because an excessively small diameter causes difficulty in forming electron conducting paths whereas an excessively large diameter may inhibit gas diffusion in the electrode catalyst layers and prevent efficient use of the catalyst (in other words, unavailable parts of the catalyst increase). A range of 10-100 nm is more preferable.

In addition, both the first carbon particles, which are contained in the complex particles, and the second carbon particles, which are mixed together with the complex particles, of the present invention may be the same type of carbon particles as long as the carbon particles satisfy the relationship of specific surface area previously described. On the contrary, the first carbon particles and the second carbon particles may also be different types of carbon particles.

An MEA and a fuel cell of the present invention are described in detail below.

Proton conductive polymer electrolytes can be used as a polymer electrolyte membrane in the MEA related to the embodiment of the present invention. A fluorine-based polymer electrolyte, for example, Nafion® (made by Du Pont), Flemion® (made by ASAHI GLASS CO., LTD.), Aciplex® (made by Asahi KASEI Cooperation), and Gore Select® (by Japan Gore-Tex Inc.) can be used. In addition, hydrocarbon-based polymer electrolyte such as sulfonated polyether ketone and sulfonated polyether sulfone etc. can also be used as the polymer electrolyte membrane. Among others, materials of Nafion® series made by DuPont may preferably be used.

Proton conductive polymer electrolytes can be used as the polymer electrolytes contained in the catalyst inks related to the embodiment of the present invention. A fluorine-based polymer electrolyte or a hydrocarbon-based polymer electrolyte which is the same as the polymer electrolyte membrane can also be used as the polymer electrolytes contained in the catalyst inks. Among others, materials of Nafion® series made by DuPont may preferably be used. Considering adhesiveness between the electrode catalyst layer and the polymer electrolyte membrane, it is preferable to use the same polymer electrolyte in the catalyst inks as the polymer electrolyte membrane.

In addition, both the first polymer electrolyte, which is contained in the complex particles, and the second polymer electrolyte, which is mixed together with the complex particles, may be the same polymer electrolyte although it is not necessary.

A solvent in which the polymer electrolyte can be dissolved with high fluidity or dispersed as a fine gel and yet in which particles of the catalyst and the polymer electrolyte do not corrade can be used as the solvent of the catalyst inks. It is preferable that the solvent contains a volatile organic solvent. Alcohols such as methanol, ethanol, 1-propanol, 2-propanol, 1-butanol, 2-butanol, isobutyl alcohol, tert-butyl alcohol and pentanol etc., ketone solvents such as acetone, methyl ethyl ketone, pentanone, methyl isobutyl ketone, heptanone, cyclohexanone, methyl cyclohexanone, acetonyl acetone and diisobutyl ketone etc., ether solvents such as tetrahydrofuran, dioxane, diethylene glycol dimethyl ether, anisole, methoxytoluene and dibutyl ether etc., and other polar solvents such as dimethylformamide, dimethylacetamide, N-methylpyrrolidone, ethylene glycol, diethylene glycol, diacetone alcohol and 1-methoxy-2-propanol etc. are often used although the dispersant is not limited to these solvents. In addition, any solvent mixture of a combination of a plurality of these solvents may also be used.

In addition, solvents of a lower alcohol have a high risk of igniting. When using one of such solvents, a mixture with water is preferably used as the solvent since water which is highly soluble in the polymer electrolyte can be contained without serious problems. There is no particular limitation to a water additive amount unless the polymer electrolyte is separated from the solvent to generate white turbidity or turn into a gel.

A dispersant may be contained in the catalyst inks in order to disperse the catalyst, the carbon particles (the first carbon particles and the second carbon particles) and/or the "catalyst loaded carbon particles". An anion surfactant, a cation surfactant, an amphoteric (or ampholytic) surfactant and a non-ionic surfactant etc. can be used as the dispersant. Among these, sulfonate type of anion surfactants such as alkylbenzene sulfonic acids, oil soluble alkylbenzene sulfonic acids, α-olefin sulfonic acids, sodium alkylbenzene sulfonates, oil soluble alkylbenzene sulfonates, and α-olefin sulfonates are preferable considering aspects such as carbon's dispersing effects and influence of residual dispersant on catalyst performance.

The catalyst inks receive a dispersion treatment if necessary. Particle-size and viscosity of the catalyst inks can be controlled by a condition of the dispersion treatment. The dispersion treatment can be performed with various types of equipment. It is possible to perform the dispersion treatment using various types of equipment. A treatment using a ball mill, a treatment using a roll mill and an ultrasonic dispersion treatment etc. are examples.

Amounts of a solid content in the catalyst inks are preferred to be in the range of 1-50% by weight. In the case where an amount of the solid content is excessively large, cracks tend to be easily created on a surface of the electrode catalyst layer since the viscosity of the catalyst ink is too high. On the other hand, in the case where the amount of the solid content is too small, a forming rate of the catalyst layer becomes too low to ensure appropriate productivity. The solid content mainly includes components such as the catalyst, the carbon particles and the polymer electrolyte. The viscosity of the catalyst inks increases when a higher amount of carbon particles is contained in the same amount of the solid content, and vice versa. Hence, it is preferable that a ratio of the carbon particles with respect to a total solid content is adjusted within the range of 10-80% by weight. At this time, the viscosity of the catalyst inks is preferable in the range of 0.1-500 cP, and more preferably in the range of 5-100 cP. In addition, a dispersant may be added to the catalyst inks in order to control the viscosity when dispersing the solid content therein.

In addition, the catalyst inks may include a pore forming agent. Fine pores are created by removing the pore forming agent after the electrode catalyst is formed. Examples of the pore forming agent are materials soluble in acid, alkali or water, sublimation materials such as camphor, and materials which decompose by heat. If the pore former is soluble in warm water, it can be removed by water produced during the power generation.

In the manufacturing method of the electrode catalyst layer of the present invention, the complex particles can also be obtained by coating the first catalyst ink, in which the catalyst, the first carbon particles and the first polymer electrolyte are dispersed in a solvent, on a transfer sheet followed by drying. Otherwise the complex particles can also be obtained directly by spraying the first catalyst ink into a dry atmosphere.

In the manufacturing method of the electrode catalyst layer of the present invention, the second carbon particles, the complex particles, in which the catalyst and the first carbon particles are embedded in the first polymer electrolyte, and the second polymer electrolyte are dispersed in a solvent to prepare the second catalyst ink for manufacturing electrode catalyst layers. The second catalyst ink is coated on a substrate and dried to form an electrode catalyst layer. In the case where a gas diffusion layer or a transfer sheet is used as the substrate, the electrode catalyst layer is joined to each of both surfaces of the polymer electrolyte membrane by an assembling process. In the case where the polymer electrolyte membrane is used as the substrate, the MEA of the present invention is obtained in a way that the second catalyst ink is coated directly on each of both surfaces of the polymer electrolyte membrane to directly form the electrode catalyst layers.

The coating method at this time may be, for example, a doctor blade method, a dipping method, a screen printing method, a roll coating method or a spraying method etc.

The gas diffusion layer, the transfer sheet and the polymer electrolyte membrane etc. can be used as the substrate in the manufacturing method of the electrode catalyst layers of the present invention. The gas diffusion layer may be made of a material having not only gas diffusion properties but also conductivity. The transfer sheet is made of a material capable of transferring and may be a film of a fluororesin, for example.

In the case where the transfer sheet is used as the substrate, the transfer sheet is released after attaching the electrode catalyst layer onto the polymer electrolyte membrane so that the MEA, which has the electrode catalyst layer on each of both surfaces of the polymer electrolyte membrane, is obtained. In the case where the gas diffusion layer is used as the substrate, the substrate of the gas diffusion layer does not need to be released even after the electrode catalyst layer is attached onto the polymer electrolyte membrane.

A gas diffusion layer and a separator which are used in a conventional fuel cell can be used as the gas diffusion layers and the separators of the present invention. Specifically, carbon cloths, carbon papers and porous carbons in a form of unwoven cloth etc. can be used as the gas diffusion layers. Separators of a carbon type and separators of a metal type etc. can be used as the separators. The fuel cell of the present invention can be fabricated by assembling the MEA of the present invention and other peripheral equipment such as gas supplying equipment and cooling equipment etc.

EXAMPLE

Although the manufacturing method of the electrode catalyst layer for a fuel cell of the present invention is described below with specific examples and comparative examples, the present invention is not limited to these examples.

Example 1

Preparing a First Catalyst Ink

20% by weight (as a catalyst content) of "catalyst loaded carbon particles" (catalyst: TaCNO, carrier: Ketjen Black, specific surface area: about 100 $m^2/g$) and a 20% by weight solution (solvent: IPA, ethanol and water) of a first polymer electrolyte (Nafion®, made by DuPont) were mixed together in a solvent followed by performing a dispersion treatment using a planetary ball mill (product code: P-7, by Fritsch Japan Co., Ltd). The resultant first catalyst ink had a composition ratio of 1:0.2 as a weight of the "catalyst loaded carbon particles" to the first polymer electrolyte. A solvent mixture of 1:1 by volume of ultrapure water and 1-propanol was used as the solvent.

<Preparing a "Catalyst Loaded Carbon Particles Embedded in a First Polymer Electrolyte" as Complex Particles>

A sheet of PTFE was used as a substrate for drying the first catalyst ink. The first catalyst ink was coated on the substrate by a doctor blade. Subsequently, the first catalyst ink was dried under atmosphere at 80° C. for five minutes. Then, "catalyst loaded carbon particles embedded in the first polymer electrolyte" as complex particles were obtained on the substrate and collected.

<Blending Complex Particles with Second Carbon Particles, and Subsequent Heating>

The "catalyst loaded carbon particles embedded in the first polymer electrolyte" as complex particles were blended together with second carbon particles (Ketjen Black, product code: EC-300J, made by Lion Corporation, specific surface area: about 800 m$^2$/g) without any solvent using a planetary ball mill. Subsequently, the resultant mixture received a heat treatment at 100° C. The mixture had 1:1 of composition ratio by weight between the "catalyst loaded carbon particles" and the second carbon particles.

<Preparing a Second Catalyst Ink>

The resultant product of blending the complex particles with the second carbon particles followed by heating was further blended together with a 20% by weight solution (solvent: IPA, ethanol and water) of a second polymer electrolyte (Nafion®, made by DuPont) in a solvent and a dispersion treatment was performed using a planetary ball mill. Then, a second catalyst ink having a 1:1:0.8 by weight composition ratio among the "catalyst loaded carbon particles" in the complex particles, the second carbon particles and the second polymer electrolyte was obtained. 1:1 by volume of solvent mixture of ultrapure water and 1-propanol was used as the solvent.

<Forming an Electrode Catalyst Layer>

A sheet of PTFE was used as a transfer sheet. The second catalyst ink was coated on the transfer sheet using a doctor blade and dried under atmosphere at 80° C. for five minutes. An electrode catalyst layer 2 for an air electrode was formed by adjusting the thickness in such a way that an amount of the catalyst which was loaded on the electrode catalyst layer in all was 0.4 mg/cm$^2$.

Example 2

Preparing a First Catalyst Ink

A catalyst (TaCNO, specific surface area: about 9 m$^2$/g), first carbon particles (Ketjen Black, product code: EC-300J, made by Lion Corporation, specific surface area: about 800 m$^2$/g) and a 20% by weight solution (solvent: IPA, ethanol and water) of the first polymer electrolyte (Nafion®, made by DuPont) were mixed together in a solvent followed by performing a dispersion treatment using a planetary ball mill (product code: P-7, by Fritsch Japan Co., Ltd). The resultant first catalyst ink had a 1:0.1 of composition ratio by weight between the catalyst and the first carbon particles, and a 1:2.5 of composition ratio by weight between the first carbon particles and the first polymer electrolyte. A solvent mixture of 1:1 by volume of ultrapure water and 1-propanol was used as the solvent.

<Preparing a "Catalyst Embedded in the First Polymer Electrolyte">

A sheet of PTFE was used as a substrate for drying the first catalyst ink. The first catalyst ink was coated on the substrate using a doctor blade. Subsequently, the first catalyst ink was dried under atmosphere at 80° C. for five minutes. Then, "complex particles" in which the catalyst and the first carbon particles were embedded in the first polymer electrolyte were obtained on the substrate and collected.

<Blending Complex Particles with Second Carbon Particles, and Subsequent Heating>

The complex particles were blended together with second carbon particles (Ketjen Black, product code: EC-300J, made by Lion Corporation, specific surface area: about 800 m$^2$/g) without any solvent using a planetary ball mill. Subsequently, the resultant mixture received a heat treatment at 100° C. The mixture had a 1:0.9 by weight composition ratio between the catalyst and the second carbon particles, that is, carbon particles which were not contained in the complex particles.

<Preparing a Second Catalyst Ink>

The resultant product of blending the complex particles with the second carbon particles followed by heating was further blended together with a 20% by weight solution (solvent: IPA, ethanol and water) of a second polymer electrolyte (Nafion®, made by DuPont) in a solvent and a dispersion treatment was performed using a planetary ball mill. Then, a second catalyst ink having a 1:1:0.8 by weight composition ratio among the catalyst, the second carbon particles and the second polymer electrolyte was obtained. A solvent mixture of 1:1 by volume of ultrapure water and 1-propanol was used as the solvent.

<Forming an Electrode Catalyst Layer>

A sheet of PTFE was used as a transfer sheet. The second catalyst ink was coated on the transfer sheet using a doctor blade and dried under atmosphere at 80° C. for five minutes. An electrode catalyst layer 2 for an air electrode was formed by adjusting the thickness in such a way that an amount of the catalyst which was loaded on the electrode catalyst layer in all was 0.4 mg/cm$^2$.

Comparative Example 1

Preparing a Catalyst Ink

20% by weight (as a catalyst content) of "catalyst loaded carbon particles" (catalyst: TaCNO, carrier: Ketjen Black, specific surface area: about 100 m$^2$/g), carbon particles (Ketjen Black, product code: EC-300J, made by Lion Corporation, specific surface area: about 800 m$^2$/g) and a 20% by weight solution (solvent: IPA, ethanol and water) of a polymer electrolyte (Nafion®, made by DuPont) were mixed together in a solvent followed by performing a dispersion treatment using a planetary ball mill (product code: P-7, by Fritsch Japan Co., Ltd). The resultant catalyst ink had a 1:1:0.8 by weight composition ratio among the "catalyst loaded carbon particles", the carbon particles and the polymer electrolyte. A solvent mixture of 1:1 by volume of ultrapure water and 1-propanol was used as the solvent.

<Forming an Electrode Catalyst Layer>

A sheet of PTFE, which was the same one used in the Examples, was used as a transfer sheet. The catalyst ink was coated on the transfer sheet and dried in the same way as in the Examples. An electrode catalyst layer 2 for an air electrode was formed by adjusting the thickness in such a way that an amount of the catalyst which was loaded on the electrode catalyst layer in all was 0.4 mg/cm².

Comparative Example 2

Preparing a Catalyst Ink

A catalyst (TaCNO, specific surface area: about 9 m²/g), carbon particles (Ketjen Black, product code: EC-300J, made by Lion Corporation, specific surface area: about 800 m²/g) and a 20% by weight solution (solvent: IPA, ethanol and water) of a polymer electrolyte (Nafion®, made by DuPont) were mixed together in a solvent followed by performing a dispersion treatment using a planetary ball mill (product code: P-7, by Fritsch Japan Co., Ltd). The resultant catalyst ink had a 1:1:0.8 by weight composition ratio among the catalyst, the carbon particles and the polymer electrolyte. A solvent mixture of 1:1 by volume of ultrapure water and 1-propanol was used as the solvent.
<Forming an Electrode Catalyst Layer>

A sheet of PTFE, which was the same one used in the Examples, was used as a transfer sheet. The catalyst ink was coated on the transfer sheet and dried in the same way as in the Examples. An electrode catalyst layer 2 for an air electrode was formed by adjusting the thickness in such a way that an amount of the catalyst which was loaded on the electrode catalyst layer in all was 0.4 mg/cm².
<<Forming an Electrode Catalyst Layer for a Fuel Electrode>>

An electrode catalyst layer for a fuel electrode is formed as described below in Examples and Comparative examples. A catalyst of "platinum loaded carbon particles" (amount of loaded platinum: 50% by weight to the whole, product code: TEC10E50E, made by Tanaka Kikinzoku Kogyo K.K.) and a 20% by weight solution (solvent: IPA, ethanol and water) of a polymer electrolyte (Nafion®, made by DuPont) were mixed together in a solvent followed by performing a dispersion treatment using a planetary ball mill (product code: P-7, by Fritsch Japan Co., Ltd). The resultant catalyst ink had a 1:1 by weight composition ratio between carbons in the "platinum loaded carbon particles" and the polymer electrolyte. A solvent mixture of 1:1 by volume of ultrapure water and 1-propanol was used as the solvent. The catalyst ink was coated on the substrate and dried in a similar way to the case of the electrode catalyst layer 2 for the air electrode. The electrode catalyst layer 3 for the fuel electrode was formed by adjusting the thickness in such a way that an amount of the catalyst which was loaded on the layer in all was 0.3 mg/cm².
<<Fabricating a Membrane Electrode Assembly>>

A substrate on which the electrode catalyst layer 2 for the air electrode was formed described in the Examples and Comparative examples and a substrate on which the electrode catalyst layer 3 for the fuel electrode was formed described above were respectively stamped out in a shape of 5 cm² square and arranged facing both surfaces of a polymer electrolyte membrane (Nafion®212, made by DuPont). Subsequently, hot pressing was performed at 130° C. to obtain an MEA 12. After arranging a pair of carbon cloths having a filler layer as gas diffusion layers on the both surfaces, the resultant MEA 12 was further interposed between a pair of separators 10 so that a single cell of PEMFC or PEFC was fabricated.
<<Power Generation Performance>>
<Measurement>

Power generation performance was evaluated under a condition of 80° C. cell temperature and 100% RH (relative humidity) both in an anode and cathode using a fuel cell test apparatus GFT-SG1 made by TOYO Corporation. Pure hydrogen as a fuel gas and pure oxygen as an oxidant gas were used under a control of constant flow rates.
<Result>

Table 1 shows power generation performance of the MEA manufactured in Example 1 relative to the MEA manufactured in Comparative example 1. The MEA of Example 1 had a power generation performance superior to the MEA of Comparative example 1. Specifically, the MEA performance of Example 1 was 2.3 times as high as that of Comparative example 1 when the fuel cell is operated at a voltage about 0.6 V. Such a result of Example 1 is probably attributable to an improved conductivity on a surface of the catalyst and increased active reaction sites, which are brought about by embedding the "catalyst loaded carbon particles" in the polymer electrolyte. On the other hand, it seems that in Comparative example 1 the carbon particles, which had a larger specific surface area than the "catalyst loaded carbon particles", were dominantly embedded in the polymer electrolyte and proton conductivity became insufficient on the surface of the catalyst because the carbon particles, the "catalyst loaded carbon particles" and the polymer electrolyte were dispersed together in the solvent at once (without preliminarily embedding the "catalyst loaded carbon particles" in the polymer electrolyte).

TABLE 1

|  | Voltage | | |
| --- | --- | --- | --- |
|  | 0.6 V | 0.4 V | 0.2 V |
| Current density (Example/Comparative example) | 2.3 | 2.5 | 2.6 |

Table 2 shows power generation performance of the MEA manufactured in Example 2 relative to the MEA manufactured in Comparative example 2. The MEA of Example 2 had a power generation performance superior to the MEA of Comparative example 1. Specifically, the MEA performance of Example 2 was 2.0 times as high as that of Comparative example 2 when the fuel cell is operated at a voltage about 0.6 V. Such a result of Example 2 is probably attributable to an improved conductivity on a surface of the catalyst and increased active reaction sites, which are brought about by embedding the catalyst and the first carbon particles in the polymer electrolyte. On the other hand, it seems that in Comparative example 2 the carbon particles, which had a larger specific surface area than the catalyst, were dominantly embedded in the polymer electrolyte and proton conductivity on the surface of the catalyst along with a contact between the catalyst and the carbon particles became insufficient because the catalyst, the carbon particles and the polymer electrolyte were dispersed together in the solvent at once (without preliminarily embedding the catalyst in the polymer electrolyte).

TABLE 2

|  | Voltage | | |
| --- | --- | --- | --- |
|  | 0.6 V | 0.4 V | 0.2 V |
| Current density (Example/Comparative example) | 2.0 | 2.2 | 2.5 |

It was confirmed that the fuel cells which employed the MEA of the present invention had a high level of power generation performance, as described above.

INDUSTRIAL APPLICABILITY

The present invention includes a manufacturing method of an electrode catalyst layer comprising a polymer electrolyte, a catalyst and carbon particles, wherein the catalyst and a part of the carbon particles are preliminarily embedded in the polymer electrolyte. As a result, it is possible to improve output performance of a fuel cell by the present invention since not only proton conductivity on a surface of the catalyst is improved but also active reaction sites are increased due to a sufficient contact between the catalyst and the carbon particles. A method of the present invention is industrially valuable because of a remarkable effect that it enables an oxide type of non-platinum catalysts to work better in an electrode catalyst layer so that a higher power generation performance is achieved than a conventional method. Therefore, the present invention is preferably applied to a PEMFC (or PEFC), especially to a single fuel cell or fuel cell stack in a household fuel-cell system or a fuel-cell car etc.

What is claimed is:

1. A manufacturing method of an electrode catalyst layer for a fuel cell, the method comprising:
    preparing a first catalyst ink in which at least an oxide type of non-platinum catalyst, first carbon particles and a first polymer electrolyte are dispersed in a first solvent;
    drying said first catalyst ink to form complex particles in which said catalyst and said first carbon particles are embedded in said first polymer electrolyte;
    performing a pretreatment in which said complex particles and second carbon particles are mixed together without any solvent before preparing a second catalyst ink;
    performing a heat treatment which said complex particles and said second carbon particles receive after performing said pretreatment and before preparing a second catalyst ink, wherein said complex particles and said second carbon particles receive said heat treatment without any solvent, and said heat treatment is performed at a temperature in the range of 50-180° C.;
    preparing said second catalyst ink in which said complex particles, said second carbon particles and a second polymer electrolyte are dispersed in a second solvent; and
    coating said second catalyst ink on a substrate to form an electrode catalyst layer.

2. The manufacturing method according to claim 1, wherein said first catalyst ink is dried at a temperature in the range of 30-140° C.

3. The manufacturing method according to claim 1, wherein said catalyst is a product made by partially-oxidizing a carbonitride of Ta.

4. The manufacturing method according to claim 1, wherein said catalyst and said first carbon particles form catalyst loaded carbon particles, wherein said second carbon particles have a larger specific surface area than said catalyst loaded carbon particles, and wherein a weight ratio between said first carbon particles and said first polymer electrolyte is in the range of 1:0.05 to 1:10.

5. The manufacturing method according to claim 1, wherein said first carbon particles have a larger specific surface area than said catalyst, wherein a weight ratio between said catalyst and said first carbon particles is in the range of 1:0.01 to 1:0.5, and wherein a weight ratio between said first carbon particles and said first polymer electrolyte is in the range of 1:0.5 to 1:50.

6. A manufacturing method of an electrode catalyst layer for a fuel cell, the method comprising:
    preparing a first catalyst ink in which at least first carbon particles, a first polymer electrolyte and an oxide type of non-platinum catalyst which is not preliminarily embedded in said first carbon particles are dispersed in a first solvent;
    drying said first catalyst ink to form complex particles in which said catalyst and said first carbon particles are embedded in said first polymer electrolyte;
    performing a pretreatment in which said complex particles and second carbon particles are mixed together without any solvent before preparing a second catalyst ink, wherein said complex particles and said second carbon particles are mixed while said complex particles and said second carbon particles are milled;
    performing a heat treatment which said complex particles and said second carbon particles receive after performing said pretreatment and before preparing a second catalyst ink, wherein said heat treatment is performed at a temperature in the range of 50-180° C.;
    preparing said second catalyst ink in which said complex particles, said second carbon particles and a second polymer electrolyte are dispersed in a second solvent; and
    coating said second catalyst ink on a substrate to form an electrode catalyst layer,
    wherein said catalyst contains at least one transition metal selected from a group consisting of Ta, Nb, Ti and Zr.

7. The manufacturing method according to claim 6, wherein said first catalyst ink is dried at a temperature in the range of 30-140° C.

8. The manufacturing method according to claim 6, wherein said catalyst is a product made by partially-oxidizing a carbonitride of one transition metal selected from a group consisting of Ta, Nb, Ti and Zr.

9. The manufacturing method according to claim 8, wherein said one transition metal is Ta.

* * * * *